Feb. 7, 1967  F. M. WOOD ET AL  3,302,453

METHOD OF INSPECTION UTILIZING ULTRASONIC ENERGY

Filed April 15, 1963  2 Sheets-Sheet 1

INVENTORS
Fenton M. Wood &
Noel B. Proctor

BY Arnold and Roylance

ATTORNEYS

United States Patent Office 3,302,453
Patented Feb. 7, 1967

3,302,453
METHOD OF INSPECTION UTILIZING
ULTRASONIC ENERGY
Fenton M. Wood, Sugarland, and Noel B. Proctor, Houston, Tex., assignors, by mesne assignments, to American Machine & Foundry Company, New York, N.Y., a corporation of New Jersey
Filed Apr. 15, 1963, Ser. No. 273,101
8 Claims. (Cl. 73—67.7)

This invention relates to the testing of solid parts, and more specifically to the discovery of flaws, inclusions, or other discontinuities in such parts by detecting waves of ultrasonic energy which have been transmitted into the parts and reflected from the discontinuities.

The location of flaws or discontinuities in solid parts by ultrasonic wave reflection comprises an important technique in the field of nondestructive testing. Generally, pulsed transmission is used, and a single electro-acoustic transducer functions as both transmitter and receiver. The existence of a flaw or a discontinuity is indicated by a reflected or echo pulse return to the transducer, and the location or depth of the discontinuity is a function of the time interval elapsing between the transmission and reception of the pulse. This method is not applicable everywhere, such as in the testing of thin parts where the time interval between transmitted and received pulses is so small that it is difficult to measure, or where the location of the region to be tested makes it impossible to interrogate the region and have the reflection return over the same path to the single transducer. The method further suffers from the serious disadvantage of requiring relatively complex and sophisticated equipment for generating the pulses and measuring the time intervals between transmitted and received pulses.

If continuous wave energy is used for the inspection process rather than pulse energy, some of the problems inherent in pulse techniques are eliminated, but there is created the additional problem of distinguishing between the energy reflected from, or otherwise modified by, the discontinuity, and unmodified energy which is continuously being transmitted into the part.

A related problem, whenever separate transmitting and receiving transducers are used, is that of distinguishing between multipath transmission; i.e., distinguishing between ultrasonic energy which proceeds directly from the transmitting transducer to the receiving transducer unmodified by discontinuities, and ultrasonic energy which is reflected from or otherwise modified by such discontinuities and which comprises the energy which it is desired to detect.

It is often desirable, especially where the region to be inspected is difficult of access, or where the single transmitting and receiving transducer normally used with the reflected pulse technique is not used and the energy must describe a path between two separate transducers, to transmit the ultrasonic energy into the part at an angle other than normal to the surface. Angular transmission through an interface, however, results in the creation of two types of refracted waves within the part: longitudinal and shear waves. Since each of these waves emerges into the part from the interface at a different angle and with a different velocity, the problem of discrimination between them must be solved in order to obtain unambiguous test results.

It is an object of this invention to provide a method of flaw detection utilizing continuous wave transmission of ultrasonic energy into the part to be inspected.

It is a further object to provide such a method of flaw detection suitable for measuring flaws in pipe.

It is another object of this invention to provide such a method of flaw detection suitable for the inspection of hollow parts such as pipes and requiring access to only the outer surface.

It is a still further object of this invention to provide a method of flaw detection by introducing ultrasonic energy into a part at an angle other than normal to the surface, and wherein ambiguity between resulting shear and longitudinal refracted waves is avoided.

It is still another object of this invention to provide a method of flaw detection by the transmission of continuous wave ultrasonic energy into a part in which no ambiguity results from multipath transmission.

The invention may be understood by reference to the following detailed description taken in conjunction with the drawings, which form a part of the specification, and in which.

Figure 1:
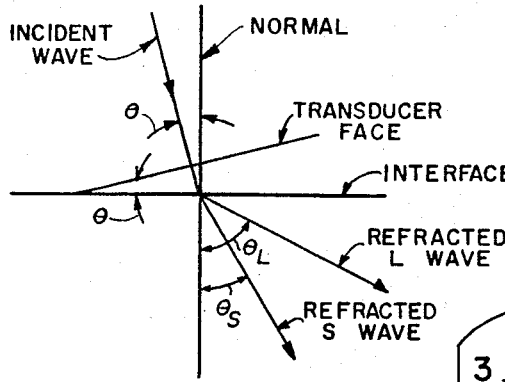
FIG. 1 is a diagram illustrating the relationship between incident and refracted ultrasonic energy transmitted through an interface at an angle other than normal.

FIG. 1 illustrates the effect of transmitting an incident ultrasonic wave through an interface at an angle other than normal. As may be seen from FIG. 1, if the face of an electro-acoustic transducer is placed at an angle $\theta$ with respect to an interface, the resulting ultrasonic wave will be incident upon the interface at an angle $\theta$ with respect to the normal to the interface. The incident wave results in two refracted waves appearing on the other side of the interface: a refracted longitudinal (L) wave and a refracted shear (S) wave. A longitudinal wave may be defined as a wave in which the particles of the medium through which the wave travels are displaced in the direction of wave travel; a shear wave may be defined as a wave in which the particles of the medium through which the wave travels are displaced in a direction perpendicular to that of wave travel. The angles which each of these incident and refracted waves make with the normal to the interface are related in accordance with Snell's Law:

$$\frac{\sin \theta}{V} = \frac{\sin \theta_L}{V_L} = \frac{\sin \theta_S}{V_S}$$

Where $\theta$ and $V$ represent the angle of incidence and the velocity, respectively, of the incident wave; $\theta_L$ and $V_L$ represent the angle of refraction and velocity of the refracted longitudinal wave; and $\theta_S$ and $V_S$ represent the angle of refraction and velocity of the refracted shear wave. Since the velocity of a longitudinal wave is much greater than that of a shear wave, the angle of refraction of a longitudinal wave will always be much greater than that of a shear wave, as may be seen in FIG. 1.

If the angle of incidence $\theta$ is too large, then the resulting angle of refraction for longitudinal waves, $\theta_L$, will be 90 degrees or greater, so that there will be no longitudinal waves transmitted through the interface. The critical angle of incidence for longitudinal waves is that incident angle $\theta$ for which $\theta_L$ equals 90 degrees. It may be determined from the formula given above by substituting 90 degrees for $\theta_L$ and the value one for sin $\theta_L$, obtaining:

$\theta$(critical angle for longitudinal waves)$\equiv$arcsin $V/V_L$

Thus the critical angle for longitudinal waves is a function of the velocities of acoustic waves in the two media forming the interface. For transmission from a water wedge into a steel pipe, this angle is about 14.5 degrees.

There is a similar relationship, defining a separate critical angle, for shear waves. However, since the angle of refraction of shear waves is less than that of longitudinal waves, the critical incident angle for shear waves is greater than that for longitudinal waves, so that whenever longitudinal waves are transmitted across the interface, shear waves will also be so transmitted.

Figure 2:
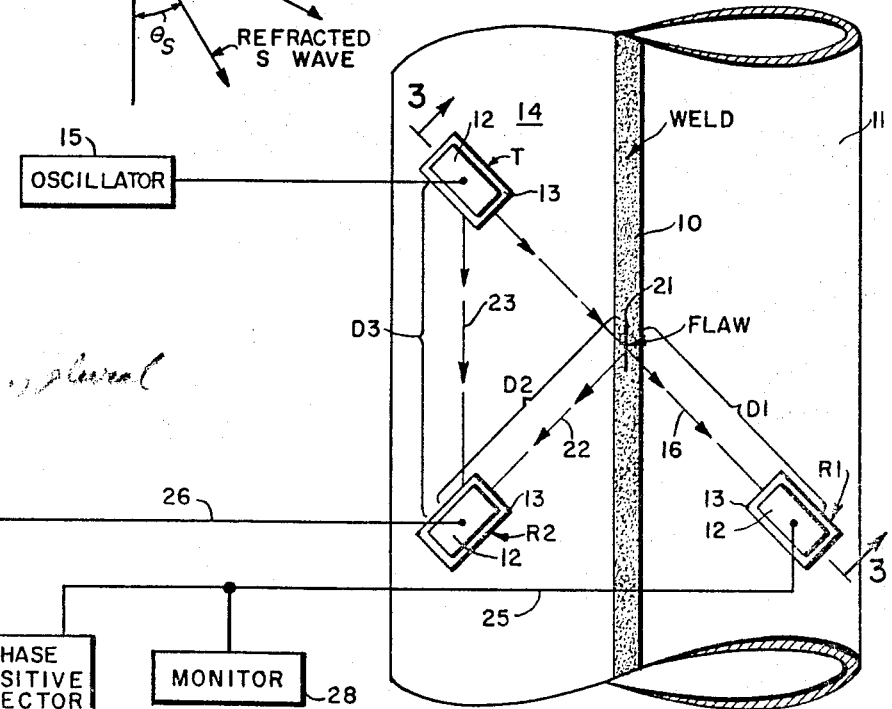
FIG. 2 is a partial block diagram and partial plan view of an embodiment of this invention in a system for the measurement of flaws in a longitudinal pipe weld.
Figure 3:
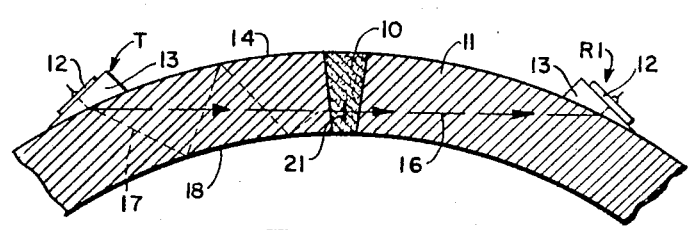
FIG. 3 is a section taken along line 3—3 of FIG. 2.

FIGS. 2 and 3 illustrate one embodiment of this invention in a system for discovering flaws in a longitudinal weld 10 in a metal pipe 11. The system utilizes a transmitting transducer T and two receiving transducers R1 and R2. Each of the three transducers comprises a transducing element 12, which may conveniently be a quartz piezoelectric crystal, and a wedge 13 for angular coupling of ultrasonic energy between transducing element 12 and the outer convex surface 14 of pipe 11. The use of such wedges in connection with transducing elements for coupling ultrasonic energy into and out of a surface at angles other than normal to the surface is well known and is discussed, for instance, in U.S. Patent 2,527,986 to Benson Carlin. The wedges 13 may be of any material suitable for coupling ultrasonic energy between the particular transducing elements used and the particular metal of which pipe 11 is constructed.

Continuous wave electrical signals at an ultrasonic frequency are generated by oscillator 15 and applied to transducing element 12 of transmitting transducer T. The transducing element transforms the electrical signals into acoustical waves at the same frequency and transmits them via coupling wedge 13 and interface 14 into pipe 11.

Wedge 13 causes the acoustic waves to be incident upon outer surface 14 at an angle other than normal to the surface and less than the critical angle for longitudinal waves. As discussed above, this creates both refracted shear waves and refracted longitudinal waves within pipe 11. Wedge 13 is shaped to provide an incident angle such that the refracted longitudinal waves follow a path through pipe 11 which is a chord of the convex outer surface 14, as shown by dashed line 16. This chordal path passes through weld 10, which is to be inspected. The refracted shear waves, on the other hand, have an angle of refraction which is considerably less than that of the longitudinal waves and, as shown by dotted line 17, are reflected from the inner concave surface 18 of pipe 11 and are subsequently repeatedly reflected back and forth between surfaces 14 and 18 and substantially dissipated before reaching either of the receiving transducers.

Receiving transducer R1 is mounted upon outer surface 14 in a position to receive refracted longitudinal waves being transmitted along path 16 and to convert these waves into the corresponding electrical signals in its transducing element 12. If there is a flaw or discontinuity 21 in weld 10, the longitudinal waves being transmitted along line 16 will be reflected from the flaw at an angle which is equal to the angle of incidence. Receiving transducer R2 is mounted upon outer surface 14 in a position to receive waves reflected from flaw 21, and converts the reflected waves into electrical signals in its transducing element 12.

The distance D1 between the intersection of path 16 with weld 10 and receiving transducer R1 is equal to the distance D2 between that intersection and receiving element R2. The straight line distance D3 between transmitting transducer T and receiving transducer R2 differs from the length of the reflected longitudinal wave path, i.e., the path from transmitting transducer T to the weld and thence back to receiving transducer R2, by a distance which is equal to one-quarter of a wave length at the frequency of the ultrasonic waves.

When the longitudinal waves following path 16 are reflected from a flaw 21, a portion of the waves will normally be directed along path 22 to receiving element R2; the remainder of the longitudinal waves will continue along path 16 to receiving element R1.

Basically, the appearance of an electrical signal at the output of receiving transducer R2 should indicate that there has been a reflection from weld 10 and, consequently, there exists a discontinuity of some sort in that weld. The necessity for transducer R1 comes about from the fact that, while most of the longitudinal wave energy follows path 16 (or path 22 if reflected from a flaw), there will be a certain amount of stray energy which will reach receiving transducer R2 via a straight line path from transmitting transducer T, indicated by dashed line 23. Since the amount of energy which will be reflected to R2 from a flaw may be quite small, it is necessary to have some means of distinguishing that reflected energy from the energy directly coupled from transmitting transducer T in order to avoid false flaw indications.

One way of distinguishing between these two types of signals received at R2 is to make their paths of travel of different lengths. They then arrive at R2 with different phases, and may be distinguished by phase detection means. Since, as we have already stated, receiving transducers R1 and R2 are located at equal distances D1 and D2 from the intersection of path 16 with weld 10, the paths of longitudinal waves from transducer T to transducer R1 and from transducer T to flaw 21 and along the reflected path 22 back to transducer R2 are equal, and therefore the waves traveling these paths will reach transducers R1 and R2 in phase. However, stray wave energy which is directly transmitted along path 23 from transducer T to transducer R2 will follow a path which differs by one-quarter of a wave length from either of the other two paths. It will thus arrive at receiving transducer R2 ninety degrees out of phase with either the reflected signal received at R2 or the directly transmitted signal received at R1.

Phase discrimination is performed by phase sensitive detector 24. This detector may be any of those phase sensitive detectors, well known in the art, which compare the phase of an input signal with the phase of a reference signal and provide a maximum D.C. output when the two are in phase and a minimum, or no output, when the two are ninety degrees out of phase. Typical examples of such detectors are those shown on pages 384 and 385 of Electronic Instruments, volume 21 of the M.I.T. Radiation Laboratory Series, McGraw-Hill.

The electrical output from receiving transducer R1 is fed via line 25 to one of the inputs of detector 24 and provides the phase reference. The output of receiving transducer R2 is fed to the other input of detector 24 via line 26. An electrical output from R2 which is in phase with the R1 electrical output indicates reflection from a flaw and results in a maximum D.C. output from detector 24. An output from R2 which is substantially ninety degrees out of phase with the R1 output and results from energy directly transmitted between transmitting transducer T and receiving transducer R2 results in no output, or a minimum output, from detector 24. Indicator 27 is connected to the output of detector 24 and is made responsive to a high level D.C. output therefrom, so as to indicate the presence of a flaw in weld 10.

The particular configuration used in the embodiment of FIGS. 2 and 3, in which the direct path to receiving transducer R1 and the reflected path to receiving transducer R2 are equal, and differ by one-quarter of a wave length from the direct line path from transmitting transducer T to receiving transducer R2, is not essential, although it is preferred since it permits the use of simple and well known phase detection means. The direct path to R1 and the reflected path to R2 could conveniently differ in length by an integral number of wave lengths, since this would present the same phase relationship to detector 24. Since most phase detectors have a maximum output, but of opposite polarity, when their inputs differ in phase by 180 degrees rather than zero degrees, the two paths could also differ in length by an integral number of half wave lengths and the indicator be set to operate upon an input signal of the opposite polarity. However, as long as the phases of the signal reflected from the flaw and the stray signal transmitted directly to R2 differ, and bear some constant relation to the reference phase of the signal received at R1, it is not necessary that distances D1, D2 and D3 be as specified above, and it will still be possible to separate the unwanted from the wanted signal by means of phase discriminating means.

To provide a continuous test of the longitudinally extending weld 10, the array of testing transducers may be moved axially with respect to pipe 11, or the pipe in turn may be moved axially with respect to the testing array.

In the case of a large flaw in weld 10, the transmitted energy may be substantially all reflected and none transmitted through to receiving transducer R1, and consequently monitor 28 may be attached to line 25 to indicate such an occurrence.

Figure 4:
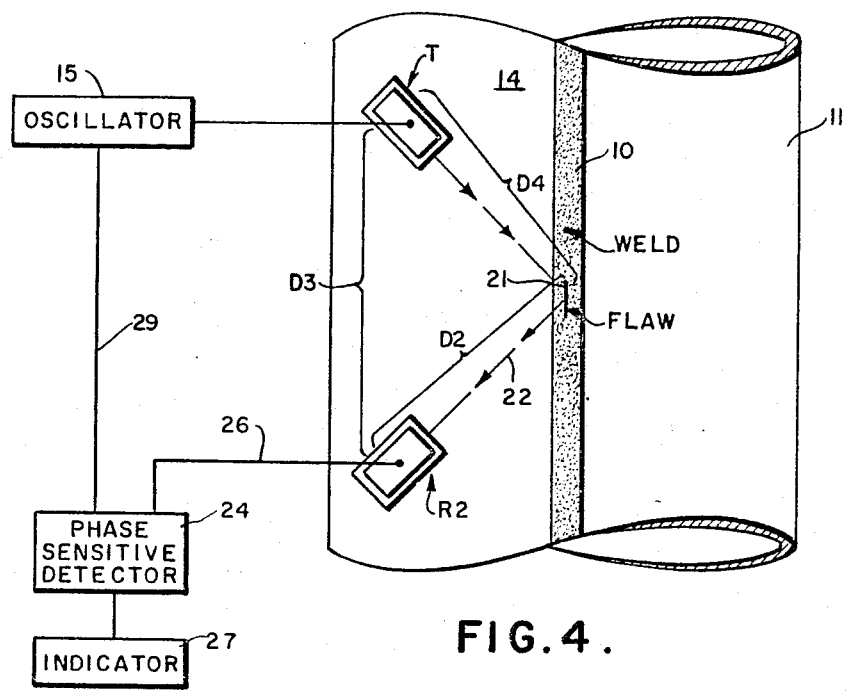
FIG. 4 is a partial block diagram and partial plan view of the system of FIGS. 2 and 3 but slightly modified and having one less transducer.

FIG. 4 illustrates a slightly modified version of the embodiment shown in FIGS. 2 and 3. The FIG. 4 system is similar to that shown in FIGS. 2 and 3 except that receiving transducer R1, which provided the phase reference, is done away with and the phase reference for detector 24 is obtained instead directly from oscillator 15 via line 29. If the path which longitudinal wave energy traverses in passing from transmitting transducer T to flaw 21 and back to receiving transducer R2, i.e., the sum of distance D4 and D2, is an integral number of wave lengths of the ultrasonic frequency being used, then a comparison of the phase of the output of receiving transducer R2 with the phase of the output of oscillator 15 in phase sensitive detector 24 will result in a maximum D.C. output when R2 is receiving energy reflected from a flaw. The output of detector 24 will be accordingly zero, or a minimum, for stray energy transmitted directly from T to R2 if distance D3 differs by approximately one-quarter of a wave length from the distance which the reflected energy follows. Actually, as mentioned above in connection with the configuration of FIGS. 2 and 3, this type of phase sensitive detector may also be used if the reflected distance equals an integral number of half wave lengths rather than an integral number of full wave lengths, since the type of phase sensitive detector described will normally give a maximum D.C. output of an opposite polarity if the input phases differ by 180 degrees. Thus, all that would be required to effect this slight change would be an indicator responsive to the opposite polarity.

The configuration discussed here has an advantage over that of FIGS. 2 and 3 in that one less transducer is required; it has a disadvantage in that it puts more stringent requirements on the location of the transmitting transducer T. In this configuration, transducer T must remain in a fixed position with respect to both receiving transducer R2 and the area of weld 10 which is being inspected, so that the relative phases of signals traversing the two paths will remain constant.

In the other configuration, of FIGS. 2 and 3, it was only necessary that the paths from T to R1 and R2 (reflected path) be equal, and was not necessary that the position of T remain constant with respect to the weld line.

In this configuration, as in that described in connection with FIGS. 2 and 3, a continuous examination may be made of weld 10 by moving the testing configuration and the pipe axially with respect to each other.

As has been described above, in connection with FIG. 3, the refracted shear waves are repeatedly reflected from the two surfaces 14 and 18 and are thus attenuated so that they do not reach the receiving transducers. Each time that these shear waves are incident upon either interface 14 or 18, a portion of their energy is transmitted through the interface and into the outside ambient (air) and the shear wave is attenuated by that transmitted increment. However, the percentage of the incident wave which is thus transmitted is relatively small when the acoustic impedances on either side of the interface are as diverse as those of metal and air, and thus the attenuation of the shear waves with each reflection is rather small. The attenuation may be increased by applying contiguous to one or both of the interfaces 14 and 18 a jacket of a material, such as water, whose acoustic impedance is closer to that of metal than is the impedance of air. With such a jacket, a greater proportion of the wave energy will be transmitted through the interface each time the wave is incident thereto. It is obviously advantageous to rapidly attenuate the shear waves and prevent any substantial portion of them from reaching the area to be inspected and possibly causing spurious responses in the testing equipment.

Figure 5:
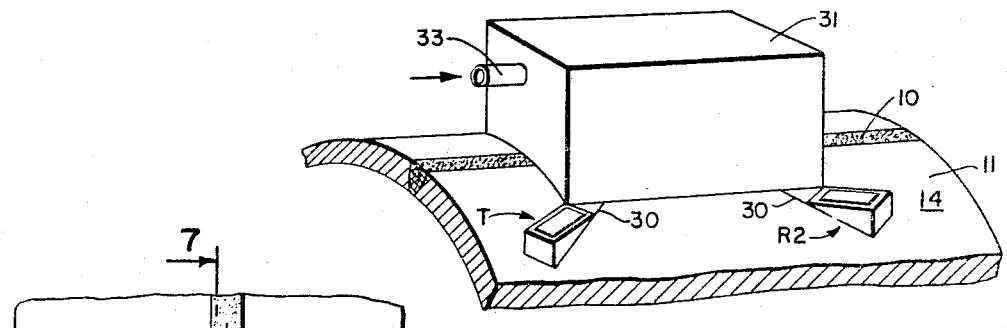
FIG. 5 is a side elevational view of a device usable in conjunction with either of the inventive embodiments of FIG. 2 or 4 to provide additional attenuation of refracted shear waves within a tested pipe wall.
Figure 6:
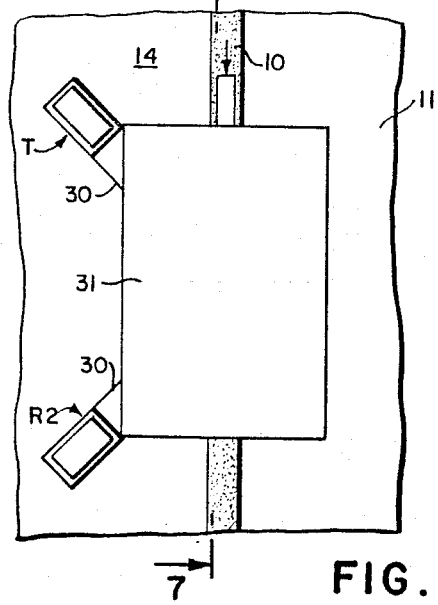
FIG. 6 is a plan view of the device of FIG. 5.
Figure 7:
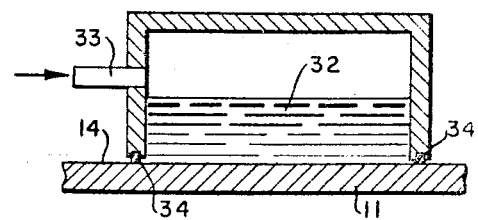
FIG. 7 is a section taken along line 7—7 of FIG. 6.

An apparatus for providing such an energy absorbing water jacket upon outer surface 14, and usable in connection with the test element configuration of FIG. 4, is shown in FIGS. 5, 6 and 7. The housing 31 of rectangular cross section supports transducers T and R2 by means of brackets 30 and fits closely over outer surface 14 of pipe 11. Housing 31 may be supplied with water 32 through inlet 33, and the water is prevented from escaping from beneath the bottom edges of the housing by means of a seal 34. The water jacket 32 covers substantially all of outer surface 14 of pipe 11 throughout the path of the longitudinal wave energy from transmitting transducer T to weld 10 and back to receiving transducer R2, and the attenuation thus provided prevents any substantial amount of shear wave energy from surviving the entire path and providing a spurious signal at receiving transducer R2.

Various changes and alterations in the methods of flaw analysis described herein which will suggest themselves to those skilled in the art are contemplated as being with the scope of this invention, which is defined solely by the claims.

What is claimed is:

1. The method of inspecting a predetermined region of a solid part for flaws, such as the longitudinal weld in a pipe, comprising the steps of:

generating a continuous wave of ultrasonic energy;
transmitting said wave of energy into the solid part via a coupling wedge at a first point on a surface of the part with an incident angle other than normal to the surface and less than the critical angle for refracted longitudinal waves,
so that refracted longitudinal waves will be transmitted in a direct path through the weld, said waves also being directed at an angle other than normal with respect to the longitudinal axis of the weld so that a portion of the longitudinal refracted waves will be reflected by a flaw in the weld to a second point on said surface,
said angle also being such that refracted shear waves are dampened by repeated reflections and not received at said second point,
detecting said reflected waves emerging from the object at an angle corresponding to the incident angle at said second point,
detecting at a third point said waves passed through the weld,
the paths of the waves being of selected distances such that the phases of the waves reflected from a flaw and received at said second point and the stray waves transmitted directly to the second point from said first point differ by some constant value other than 180 degrees and the phases of the waves received at the second and third points are in phase or 180 degrees out of phase, and measuring the phases at the second and third points to thereby note the presence of flaws while discriminating against the said stray waves.

2. The method of inspecting a predetermined region of a solid part for flaws, such as the longitudinal weld in a pipe, comprising the steps of:

generating a continuous wave of ultrasonic energy;

transmitting said wave of energy into the solid part via a coupling wedge at a first point on a surface of the part with an incident angle other than normal to the surface and less than the critical angle for refracted longitudinal waves, so that refracted longitudinal waves will be transmitted into said weld, directed at an angle other than normal with respect to the longitudinal axis of the weld so that a portion of the longitudinal refracted waves will be reflected by a flaw in the weld to a second point on said surface, said angle also being such that refracted shear waves are dampened by repeated reflections and not received at said second point, detecting said reflected waves emerging from the object at an angle corresponding to the incident angle at said second point, the path of the waves reflected from a flaw and received at said second point and the path of the stray waves transmitted directly to said second point from siad first point being of selected distances such that the phases of the reflected waves and the stray waves differ by some constant value other than 180 degrees, said path of reflected waves also being equal to an integral number of half wave-lengths of the generated wave, maintaining said first point a substantially constant distance from each said weld and said second point, and measuring the phase of said eflected waves at said second point with respect to the generated waves to thereby note the presence of flaws while discriminating against the stray waves.

3. The method of inspecting a predetermined region of a solid part for flaws, such as the longitudinal weld in a pipe, comprising the steps of:

generating a continuous wave of ultrasonic energy;

transmitting said wave of energy into the solid part via a coupling wedge at a first point on a surface of the part with an incident angle other than normal to the surface and less than the critical angle for refracted longitudinal waves, so that refracted longitudinal waves will be transmitted in a direct path through the weld, said waves also being directed at an angle other than normal with respect to the longitudinal axis of the weld so that a portion of the longitudinal refracted waves will be reflected by a flaw in the weld to a second point on said surface, and so that refracted shear waves will be repeatedly internally reflected from surfaces of the part;

placing an absorbent layer contiguous to a portion of at least one surface of the part from which said refracted shear waves are repeatedly internally reflected;

said absorbent layer having the property that its acoustic impedance is closer to the acoustic impedance of the part than is the acoustic impedence of the ambient material normally surrounding said part, and whereby said refracted shear waves will be attenuated upon each internal reflection from a surface contiguous to said layer and substantially no shear waves will reach said second point;

detecting said reflected longitudinal waves emerging from the object at an angle corresponding to the incident angle at said second point, detecting at a third point said waves passed through the weld, the paths of the waves being of selected distances such that the phases of the waves reflected from a flaw and received at said second point and the stray waves transmitted directly to the second point from said first point differ by some constant value other than 180 degrees and the phases of the waves received at the second and third points are in phase or 180 degrees out of phase, and measuring the phases at the second and third points to thereby note the presence of flaws while discriminating against the said stray waves.

4. The method of inspecting a predetermined region of a solid part for flaws, such as the longitudinal weld in a pipe, comprising the steps of:

generating a continuous wave of ultrasonic energy;

transmitting said wave of energy into the solid part via a coupling wedge at a first point on a surface of the part with an incident angle other than normal to the surface and less than the critical angle for refracted longitudinal waves, so that refracted longitudinal waves will be transmitted into said weld, directed at an angle other than normal with respect to the longitudinal axis of the weld so that a portion of the longitudinal refracted waves will be reflected by a flaw in the weld to a second point on said surface, and so that refracted shear waves will be repeatedly internally reflected from surfaces of the part;

placing an absorbent layer contiguous to a portion of at least one surface of the part from which said refracted shear waves are repeatedly internally reflected;

said absorbent layer having the property that its acoustic impedance is closer to the acoustic impedance of the part than is the acoustic impedance of the ambient material normally surrounding said part, and whereby said refracted shear waves will be attenuated upon each internal reflection from a surface contiguous to said layer and substantially no shear waves will reach said second point;

detecting said reflected longitudinal waves emerging from the object at an angle corresponding to the incident angle at said second point, the paths of the waves reflected from a flaw and received at said second point and of the stray waves transmitted directly to said second point from said first point being of selected distances such that the phases of the reflected waves and the stray waves differ by some constant value other than 180 degrees, said path of reflected waves also being equal to an integral number of half wave-lengths of the generated wave, maintaining said first point a substantially constant distance from each said weld and said second point, and measuring the phase of said reflected waves at said second point with respect to the generated waves to thereby note the presence of flaws while discriminating against the stray waves.

5. The method of inspecting a predetermined region of a solid part for flaws, such as the longitudinal weld in a pipe, comprising the steps of:

generating a continuous wave of ultrasonic energy;

transmitting said wave of energy into the solid part via a coupling wedge at a first point on a surface of the part with an incident angle other than normal to the surface and less than the critical angle for refracted longitudinal waves, so that refracted longitudinal waves will be transmitted in a direct path through the weld, said waves also being directed at an angle other than normal with respect to the longitudinal axis of the weld so that a portion of the longitudinal refracted waves will be reflected by a flaw in the weld to a second point on said surface, and said angle also being such that refracted shear waves are dampened by repeated reflections and not received at said second point, detecting said reflected waves emerging from the object at an angle corresponding to the incident angle at said second point, detecting at a third point said waves passed through the weld, the paths of the waves being of selected distances such that the phases of the waves reflected from a flaw and received at said second point and the stray waves transmitted directly to the second point from said first point differ by some constant value other than 180 degrees and the phases of the waves received at the second and third points are in phase or 180 degrees out of phase, moving the positions of said first, second and third points along the surface of said part while maintaining the distances between said first, second and third points substantially constant, and measuring the phases at the second and third points to thereby note the presence of flaws while discriminating against the said stray waves.

6. The method of inspecting a predetermined region of a solid part for flaws, such as the longitudinal weld in a pipe, comprising the steps of:

generating a continuous wave of ultrasonic energy;

transmitting said wave of energy into the solid part via a coupling wedge at a first point on a surface of the part with an incident angle other than normal to the surface and less than the critical angle for refracted longitudinal waves, so that refracted longitudinal waves will be transmitted into said weld, directed at an angle other than normal with respect to the longitudinal axis of the weld so that a portion of the longitudinal refracted waves will be reflected by a flaw in the weld to a second point on said surface, said angle also being such that refracted shear waves are dampened by repeated reflections and not received at said second point, detecting said reflected waves emerging from the object at an angle corresponding to the incident angle at said second point, the paths of the waves reflected from a flaw and received at said second point and of the stray waves transmitted directly to said second point from said first point being of selected distances such that the phases of the reflected waves and the stray waves differ by some constant value other than 180 degrees, said path of reflected waves also being equal to an integral number of half wave-lengths of the generated wave, moving the positions of said first and second points along the surface of said part while maintaining the distance between said first and second points, and the distance between said first point and said weld substantially constant, and measuring the phase of said reflected waves at said second point with respect to the generated waves to thereby note the presence of flaws while discriminating against the said stray waves.

7. The method of inspection in accordance with claim 1, wherein measuring the phases includes detecting with a phase sensitive detector the phase at said third point as a phase reference, and the phase at said second point, and indicating the output of said phase detector to thereby note the presence of a flaw.

8. The method of inspection in accordance with claim 2, wherein measuring the phases includes comparison in a phase sensitive detector of the phase of the wave transmitted at said first point as a phase reference, and the phase at said second point, and indicating the output of said phase detector to thereby note the presence of a flaw.

References Cited by the Examiner

UNITED STATES PATENTS 2,985,018 5/1961 Williams _____ 73—67.5 X

FOREIGN PATENTS 881,644 1/1943 France.
1,174,582 10/1958 France.
615,684 1/1949 Great Britain.

OTHER REFERENCES

Nondestructive Testing Handbook, vol. II, Robert C. Master, Sec. 47, pages 26 and 27, published by the Ronald Press Co., N.Y., 1959.

RICHARD C. QUEISSER, *Primary Examiner.*

J. P. BEAUCHAMP, *Assistant Examiner.*

UNITED STATES PATENT OFFICE
CERTIFICATE OF CORRECTION

Patent No. 3,302,453                         February 7, 1967

Fenton M. Wood et al.

It is hereby certified that error appears in the above numbered patent requiring correction and that the said Letters Patent should read as corrected below.

Column 7, line 30, for "siad" read -- said --; line 39, for "eflected" read -- reflected --; column 8, line 48, for "longitudinal waves" read -- waves --.

Signed and sealed this 17th day of October 1967.

(SEAL)
Attest:

Edward M. Fletcher, Jr.                      EDWARD J. BRENNER
Attesting Officer                                 Commissioner of Patents